Jan. 15, 1957  E. C. GATES  2,777,651
AIRCRAFT LANDING WHEEL ROTATING MEANS
Filed May 24, 1955  2 Sheets-Sheet 1
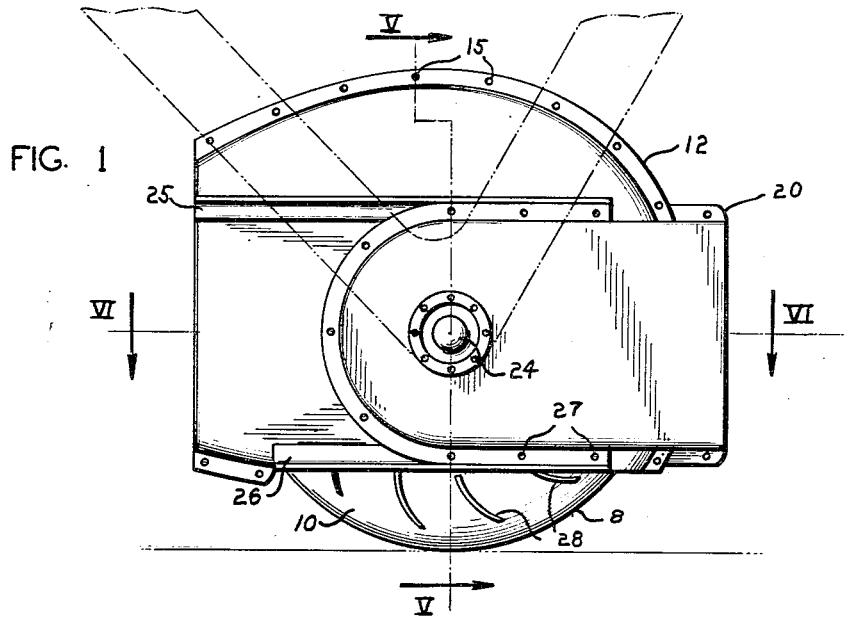
FIG. 1
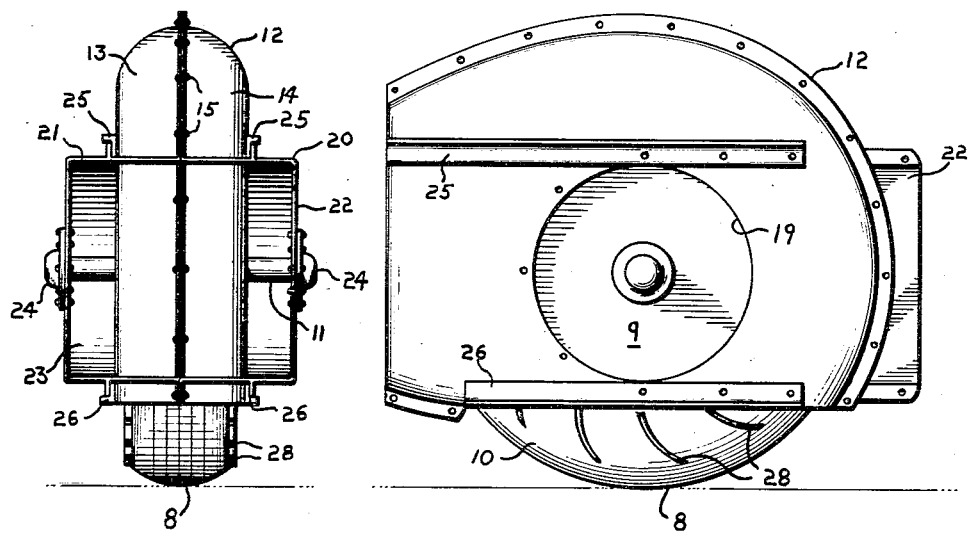
FIG. 2
FIG. 3
EDWARD C. GATES
*INVENTOR.*
BY Wenderoth, Lind & Ponack
ATTORNEYS Jan. 15, 1957 E. C. GATES 2,777,651
AIRCRAFT LANDING WHEEL ROTATING MEANS
Filed May 24, 1955 2 Sheets-Sheet 2

EDWARD C. GATES
*INVENTOR.*

BY Wendeoth, Lind & Ponack

ATTORNEYS

United States Patent Office 2,777,651
Patented Jan. 15, 1957

2,777,651

AIRCRAFT LANDING WHEEL ROTATING MEANS

Edward C. Gates, Syracuse, N. Y.

Application May 24, 1955, Serial No. 510,614

5 Claims. (Cl. 244—103)

This invention relates to means for rotating the landing wheel of an aircraft at a predetermined speed during flight and relates more particularly to an aircraft wheel with a plurality of vanes thereon and having a covering thereover with a peripheral exhaust outlet therein and an air scoop on the covering for directing air against the center of the wheel in order to rotate the wheel by the effect of the air impinging on the vanes as it passes from the center of the wheel to the periphery thereof.

The problem of how to prevent rapid wear of tread on the tires on landing wheels of aircraft, caused by friction when a tire which is not rotating strikes the ground on landing, has been productive of many solutions. Separate motors have been provided to rotate the landing wheels at the landing speed of the aircraft just prior to landing. However, these add weight to the aircraft and require power. Other means have been provided to rotate the wheels, such as fins on the sides of the tires themselves which catch air in the airstream thus causing the wheel to rotate. Air scoops have been placed in the wheel coverings to direct air against vanes on the sides of the tires in order to rotate them. Separate means to govern the speed of rotation of the wheel have usually been necessary in situations where the solution utilizing air from the airstream has been used.

Because the speed of rotation of the wheel must be quite close to the landing speed of the aircraft, in order that the speed of the tire is not rapidly increased or decreased at the moment it touches the runway, solutions to the problem which do not permit the speed of the wheel to be so limited are unsatisfactory. As above stated, governors are usually provided to limit the speed of the wheel to approximately that of the landing speed of the aircraft. The necessity for providing a governor while it makes the solution to the probelm a practical one, nevertheless presents a serious weight problem, since the governing means are usually quite complex if they are at all reliable. Thus, without governing means, the solution utilizing air from the airstream is impractical, and with governing means, the added weight negates the advantages obtained.

It is an object of the present invention to provide means for rotating the landing wheel of an aircraft at a predetermined speed which are free from the abovementioned drawbacks.

It is a further object of this invention to provide means for rotating the landing wheel of an aircraft which is simple and reliable, yet can be made to rotate the wheel at a predetermined speed.

A still further object of the present invention is to provide means of the nature described which are light-weight, yet of sturdy construction, and which require little or no maintenance other than that ordinarily given the wheel and its parts.

These and other objects will become clear from the following specification and appended claims when taken together with the accompanying drawings in which:

Fig. 1 is a side elevation of the device according to the invention;

Fig. 2 is a front elevation of the device as shown in Fig. 1;

Fig. 3 is a side elevation of the device as shown in Fig. 1 with the air scoop on one side removed to show the intake opening to the wheel chamber;

As seen in the figures, the wheel 8 comprises a hub 9 and a tire 10 thereon. The wheel is supported on an axle 11, which axle is adapted to be supported on a strut, shown in dotted outline in Fig. 1, the strut being adapted to depend from the aircraft to be supported on the wheel 8.

Figure 4:
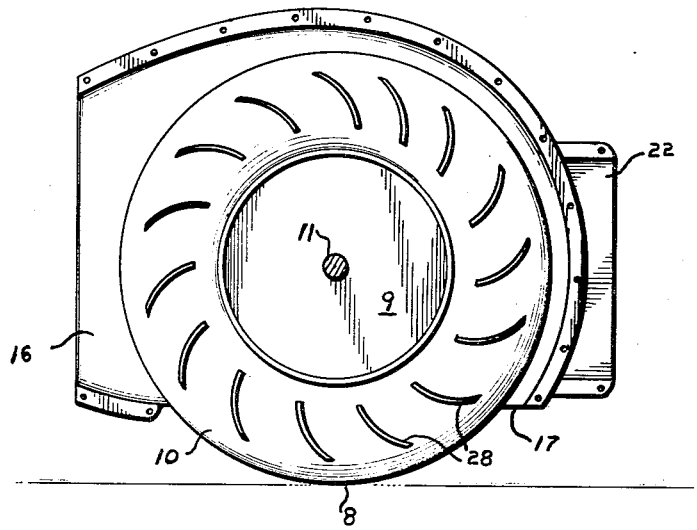
Fig. 4 is a side elevation of the device as shown in Fig. 1 with the air scoop and the side of the wheel chamber on one side removed to show the position of the wheel within the wheel chamber.
Figure 6:
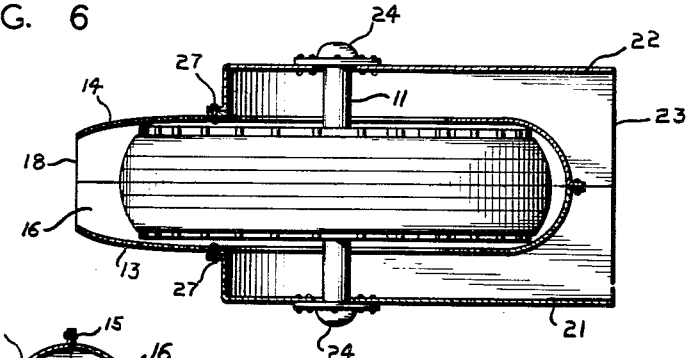
Fig. 6 is a horizontal section along line VI—VI of Fig. 1.
Figure 5:
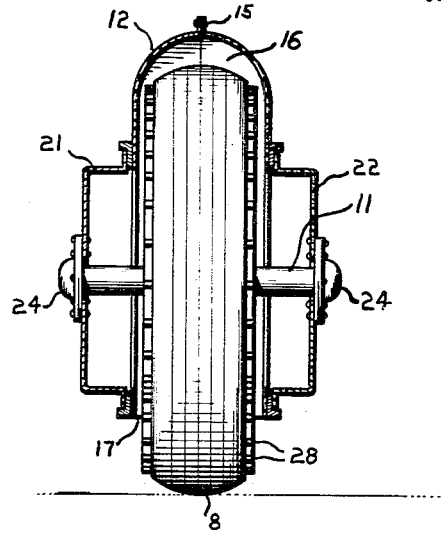
Fig. 5 is a vertical section along line V—V of Fig. 1.

Surrounding the wheel is a wheel housing 12 having a generally teardrop shape with the blunt end facing forward, and which is preferably in two parts 13 and 14. These parts are held together by bolts, rivets or like fastenings 15 through flanges on the parts 13 and 14 along the periphery of the housing. When the parts 13 and 14 are fastened together, the housing 12 defines a wheel chamber 16 within which the wheel 8 rotates. As seen in Figs. 2 and 5, the housing 12 curves over the top of the wheel 8 and extends substantially vertically downwardly close to the sides of the wheel. As seen in Fig. 6, it extends forwardly along the sides of the wheel and curves around the front of the wheel. The parts 13 and 14 of the housing 12 terminate adjacent the bottom of the wheel 8 and define a wheel opening 17 through which the wheel projects to enable it to run on a landing or take off surface. The teardrop shaped housing extends past the rear of the wheel and terminates in an exhaust opening 18.

In the substantially vertical sides of the wheel housing 12 on opposite sides of the wheel 8 are intake openings 19. These openings are substantially the same diameter as the hub 9, but the size may be varied as will be described hereafter.

Covering the intake openings 19 and extending forwardly and around the front of the wheel housing 12 and projecting forwardly therefrom is air scoop 20. The air scoop is in two parts 21 and 22, one for each side of the wheel housing, and the two parts extend forwardly along the housing and are joined together where they project ahead of the housing. As can be seen from Figs. 2 and 6, the lateral dimension of the air scoop 20 adjacent intake openings 19 is greater than the lateral dimension of the wheel housing. In the present embodiment, the air scoop extends forward with its sides parallel to the sides of the housing 12 and terminates in a substantially rectangular opening 23 forward of the front edge of the housing.

On the sides of the scoop 20 centrally positioned over the intake openings 19 are bearing housings 24 which contain bearings in which the axle 11 is supported. The axle extends through the intake openings 19 in the wheel housing 12 and supports the wheel 8 thereon.

Reinforcing strips 25 and 26 may be provided along the sides of the housing. In the present embodiment the air scoop parts 21 and 22 fit between the reinforcing strips and are secured to the housing 12 with bolts, rivets or like fastenings 27.

Around the circumference of the side walls of tire 10 are positioned vanes 28. The inner ends of the vanes are located adjacent the periphery of the intake opening 19. The vanes then extend outwardly, starting in substantially radial direction and then curving spirally outwardly along the side wall of the tire in a direction opposite to the direction in which it is desired to rotate the tire. The space between adjacent vanes thus increases with an increase of distance from the axle 11. The vanes 28 may be molded integrally with the tire 10, or may be affixed thereto after the tire is completed.

When positioned for normal operation, the device is placed around the wheel 8 of the aircraft with the air scoop 20 facing forwardly of the aircraft when the wheel is in position for landing or taking off. The exhaust opening 18 faces rearwardly, and the lower portion of the wheel 8 extends through the wheel opening 17. With the device in this position, air from the airstream enters the opening 23 at the front of the air scoop 20, the flow dividing at the front periphery of the wheel housing 12 and passing to either side thereof. Inasmuch as the air cannot flow unrestrictedly through the air scoop, a certain amount of pressure is built up therein. The air within the scoop is thereby forced laterally through intake openings 19 against the hub 9 of the wheel. Since the sides of the wheel housing 12 are quite close to the sides of the tire 10, the air has no place to go but through the passages between the vanes 28. The air will tend to flow radially adjacent the periphery of the hub, and will thus impinge against the vanes 28 and cause them to move in a direction opposite to that in which they are curved, and thus the wheel will be rotated.

It will be obvious that since the plane is to land on the wheel, it will be desirable to rotate the wheel in the same direction in which contact with the ground will rotate it. The vanes 28 will therefore be curved accordingly.

Because the entire device will be moving through the air surrounding it, a flow of air will be produced past the exhaust opening 18. The flow of air produces a vacuum in the region of the exhaust opening. This will tend to increase the velocity of the air through the vanes 28, particularly since the air entering the intake openings 19 will be under pressure.

The many advantages of the above described arrangement will be apparent to those skilled in the art. Since the air under pressure is introduced at the center of the wheel, it will tend to flow outwardly in all directions, thus acting upon substantially all of the vanes 28 on the tire. Because of the reduced pressure condition existing in the wheel chamber 16, substantially all of the air will pass through the vanes which are actually within the chamber at any given instant. These vanes which are on the portion of the tire which projects through the wheel opening 17 will not be acted on, or will only be slightly affected by the air introduced to the center of the wheel. The increase in efficiency of this arrangement over the arrangement in which air is impinged against only a few of the vanes will be readily apparent.

The possibilities of governing the speed at which the wheel will turn under the effect of the air passed between the vanes 28 is another substantial advantage in the present invention. Because of the great efficiency and relative simplicity of the device, the size of the air scoop opening 23, the intake openings 19, the exhaust opening 18 and the vanes 28 on the tire can be dimensioned to rotate the wheel 8 at a speed which is within a few revolutions of the landing speed of the aircraft on which the wheel is to be used. Similarly the relative sizes of the air scoop opening and the exhaust opening can be dimensioned to give the proper speed, as can the size, number and spacing of the vanes on the side wall of the tire. No other means for governing the speed of the wheel is necessary.

The obvious simplicity of the device makes it particularly useful on all types of aircraft. The amount of weight which will be added is far less than would be required if separate rotating means for each wheel were added to the aircraft. Further, such added weight may be compensated for by reducing the amount of rubber on the tread of the tire. Less rubber will be required because of the reduced wear on the tires. No power from the propulsion unit of the aircraft is required to rotate the wheels, all of the energy being derived from the airstream. The device requires no maintenance, other than perhaps a protective coating, which is not required in a wheel. There are no moving parts other than the wheel itself which can get out of order, and the cost is far less than the cost of other devices which accomplish the same advantageous results.

It is thought that the invention and its advantage will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. In combination, an aircraft wheel having a plurality of vanes thereon, a covering surrounding substantially all of the wheel and having an exhaust opening therein at the periphery thereof and an inlet opening thereon adjacent the center of said wheel, an air scoop on said covering over the inlet opening for directing air from the airstream against the center of said wheel, said vanes on said wheel lying in the path of air passing over the wheel from the center to the periphery thereof for rotating said wheel when said centrally directed air impinges against them while passing to said exhaust opening.

2. A combination as claimed in claim 1 in which said vanes extend spirally outwardly on said wheel.

3. In combination a wheel for an aircraft comprising a hub and a tire having a plurality of vanes thereon, a covering surrounding substantially all of said wheel and having an exhaust opening therein at the periphery thereof and an inlet opening therein adjacent the hub of said wheel, and an air scoop on said covering over the inlet opening for directing air from the airstream against said hub, said vanes on said tire extending spirally outwardly from adjacent said hub.

4. In combination, an aircraft wheel having a plurality of vanes thereon, an axle on which said wheel is mounted, a teardrop shaped covering substantially surrounding said wheel and extending close to the sides of said wheel, the portions close to the sides of the wheel having intake openings therein adjacent the center of the wheel on each side thereof, said covering further having an exhaust opening toward the point of the teardrop shape and an opening through which a portion of said wheel projects, an air scoop covering said intake openings and extending past the periphery of the covering in a direction opposite from the exhaust opening, said axle projecting through said intake openings and rotatably mounted on said air scoop, said vanes on said wheel extending spirally outwardly toward the periphery thereof.

5. In combination, an aircraft wheel having a plurality of vanes thereon, an axle on which said wheel is mounted, a covering substantially surrounding said wheel and extending close to the sides of said wheel, the portions close to the sides of the wheel having intake openings therein adjacent the center of the wheel on each side thereof, said covering further having an exhaust opening therein adjacent the periphery of the wheel and an opening through which a portion of the wheel projects, an air scoop on said covering over said intake openings and opening in a direction opposite from the direction in which the exhaust opening opens, said axle projecting through said intake openings and rotatably mounted on said air scoop, said vanes on said wheel lying in the path of air passing over the wheel from the center to the periphery thereof.

References Cited in the file of this patent

UNITED STATES PATENTS

| | | |
|---|---|---|
| 2,389,525 | Manheim | Nov. 20, 1945 |
| 2,466,568 | Bean | Apr. 5, 1949 |

FOREIGN PATENTS

| | | |
|---|---|---|
| 912,891 | France | May 13, 1946 |
| 1,015,091 | France | June 25, 1952 |